US012612109B2

(12) United States Patent     (10) Patent No.:   US 12,612,109 B2

Bhatta et al.     (45) Date of Patent:     Apr. 28, 2026

(54) VEHICLE BODY SIDE SILL REINFORCEMENT PANEL

(71) Applicant: Mahindra Integrated Solutions Private Limited, Auburn Hills, MI (US)

(72) Inventors: Lakshmi Prasad Bhatta, Troy, MI (US); Hitendra Laxmidas Gadhiya, Troy, MI (US)

(73) Assignee: Mahindra Integrated Solutions Private Limited, Auburn Hills, MI (US)

( * ) Notice: Subject to any disclaimer, the term of this patent is extended or adjusted under 35 U.S.C. 154(b) by 397 days.

(21) Appl. No.: 18/363,791

(22) Filed: Aug. 2, 2023

(65) Prior Publication Data

US 2025/0042476 A1     Feb. 6, 2025

(51) Int. Cl.
    *B62D 21/15*     (2006.01)
    *B62D 25/02*     (2006.01)
(52) U.S. Cl.
    CPC ......... *B62D 21/157* (2013.01); *B62D 25/025* (2013.01)
(58) Field of Classification Search
    CPC ... B62D 25/025; B62D 27/023; B62D 21/157
    USPC ............................... 296/209, 187.12, 29, 30
    See application file for complete search history.

(56) References Cited

U.S. PATENT DOCUMENTS

| | | | | |
|---|---|---|---|---|
| 4,826,238 A | * | 5/1989 | Misono | B62D 25/2036 |
| | | | | 296/205 |
| 9,868,469 B2 | * | 1/2018 | Sakakibara | G01S 13/931 |

| | | | | |
|---|---|---|---|---|
| 2002/0043821 A1 | * | 4/2002 | Takashina | B62D 25/025 |
| | | | | 296/203.03 |
| 2013/0026786 A1 | * | 1/2013 | Saeki | B60K 1/04 |
| | | | | 296/187.08 |
| 2020/0148277 A1 | * | 5/2020 | Leblanc | B62D 25/025 |
| 2023/0016200 A1 | * | 1/2023 | Matsui | B62D 29/007 |

(Continued)

FOREIGN PATENT DOCUMENTS

| | | | | | |
|---|---|---|---|---|---|
| DE | 102019134007 A1 | * | 6/2020 | | B60K 1/04 |
| DE | 102007023722 B4 | * | 7/2022 | | B62D 25/02 |

(Continued)

OTHER PUBLICATIONS

DE102007023722 Text (Year: 2022).*

(Continued)

*Primary Examiner* — Patricia L Engle

(74) *Attorney, Agent, or Firm* — Harness, Dickey & Pierce, P.L.C.

(57)         ABSTRACT

A vehicle body including a side sill having a side sill inner panel, a side sill outer panel, and a unitary side sill reinforcement panel located between the side sill inner panel and the side sill outer panel. The side sill reinforcement panel includes a first wall portion coupled to the side sill outer panel, a second wall portion extending from the first wall portion away from the side sill outer panel toward the side sill inner panel, a third wall portion extending from the first wall portion away from the side sill outer panel toward the side sill inner panel, a fourth wall portion extending from the third wall portion, a first flange extending from the second wall portion and coupled to the side sill inner panel, and a second flange extending from the fourth wall portion and coupled to the side sill inner panel.

18 Claims, 14 Drawing Sheets

(56)                References Cited

U.S. PATENT DOCUMENTS

2023/0312004  A1 *  10/2023  Hasegawa ............ B62D 25/025
                                                         296/187.12
2025/0214654  A1 *   7/2025  Funke .................. B62D 21/157

FOREIGN PATENT DOCUMENTS

EP          1980471  B1 *  2/2016  .......... B62D 27/026
JP         2010143477 A  *  7/2010
JP         2023015307 A  *  1/2023  .......... B62D 21/157
WO     WO-2020070935 A1 *  4/2020  ............ B62D 25/20

OTHER PUBLICATIONS

DE102019134007 Text (Year: 2020).*
EP1980471 Text (Year: 1016).*
JP20104377 Text (Year: 2010).*
JP2023015307 (Year: 2023).*
WO2020070935 Text (Year: 2020).*

* cited by examiner

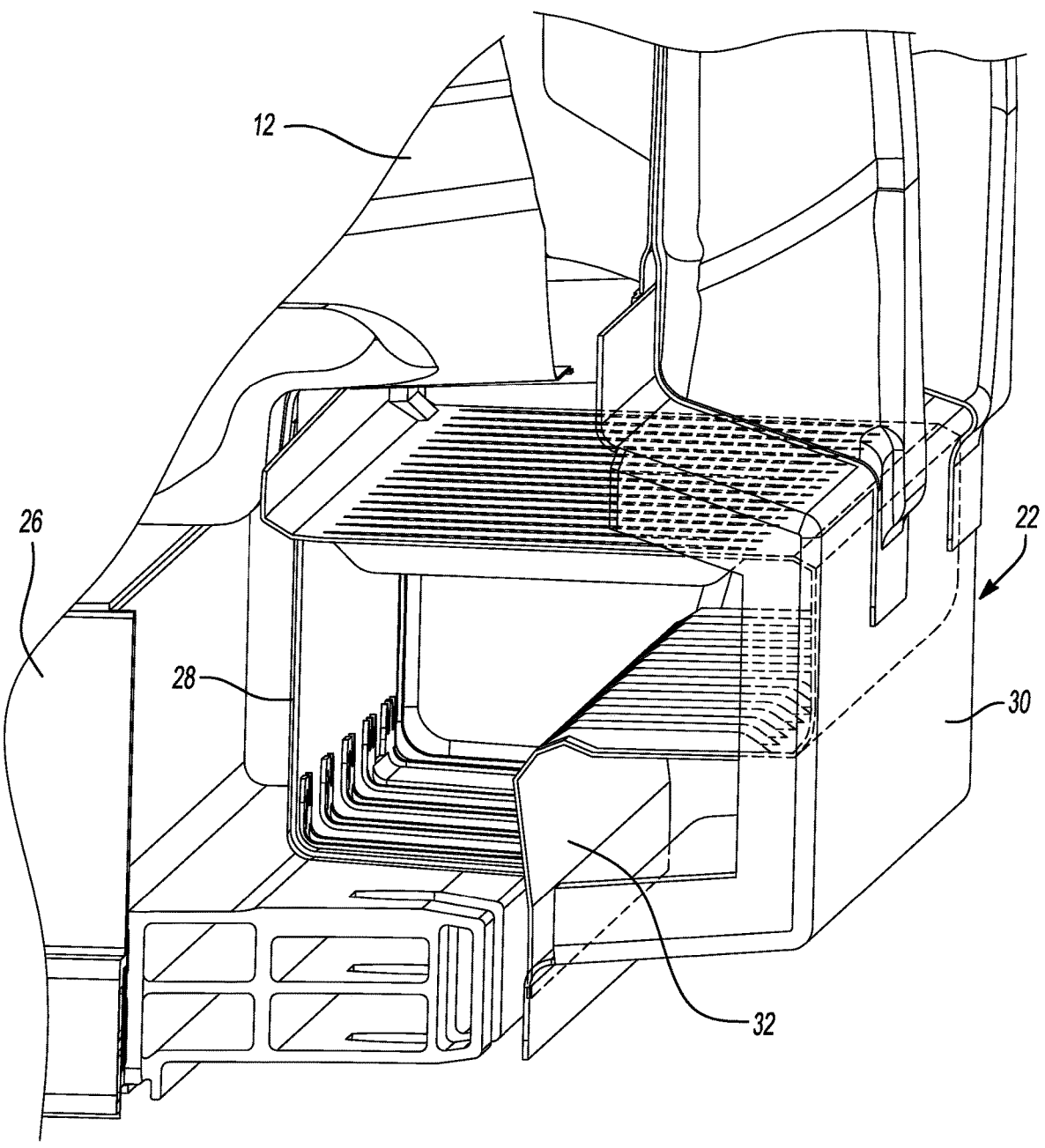
_Fig-3_

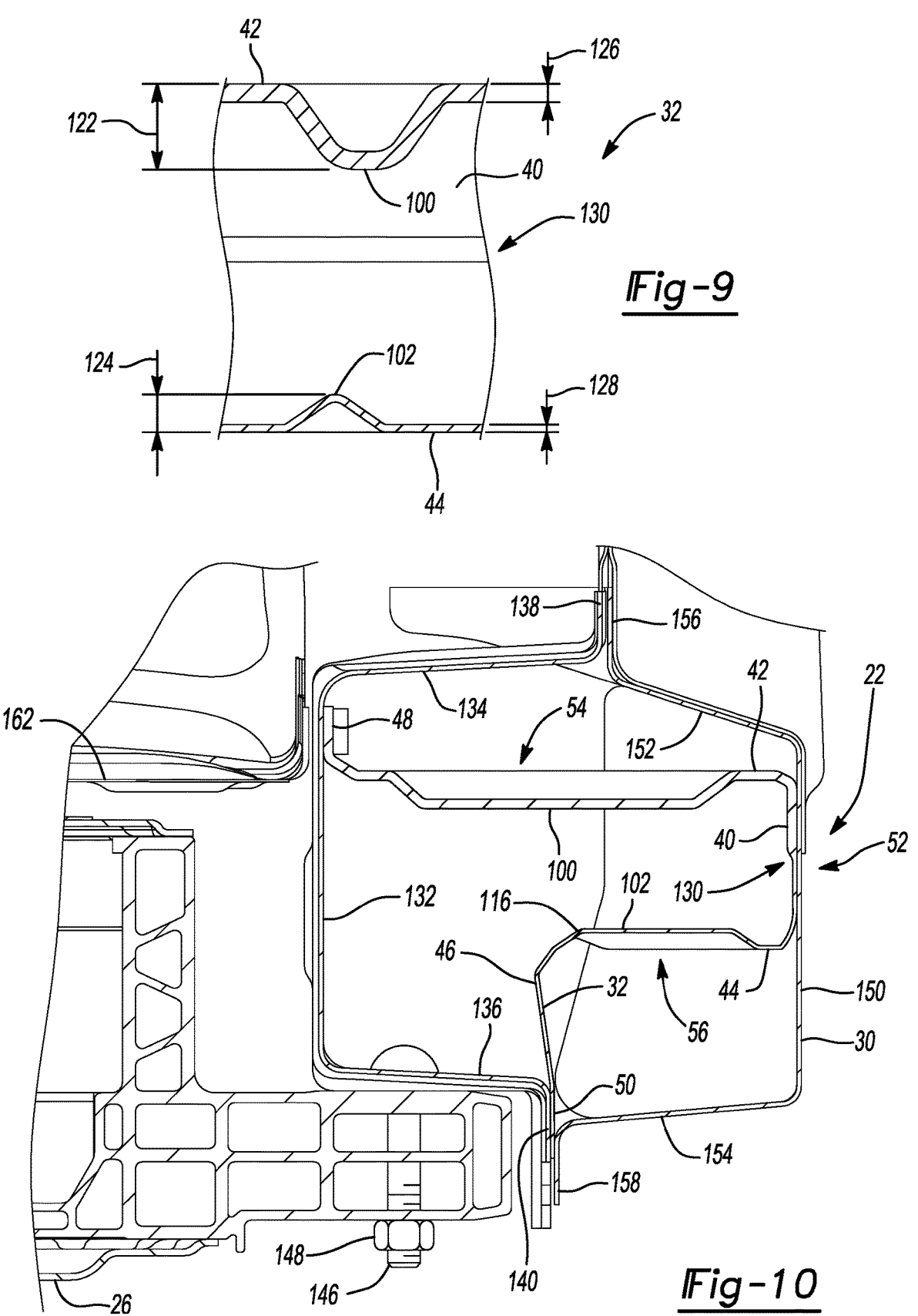
_Fig-9_
_Fig-10_

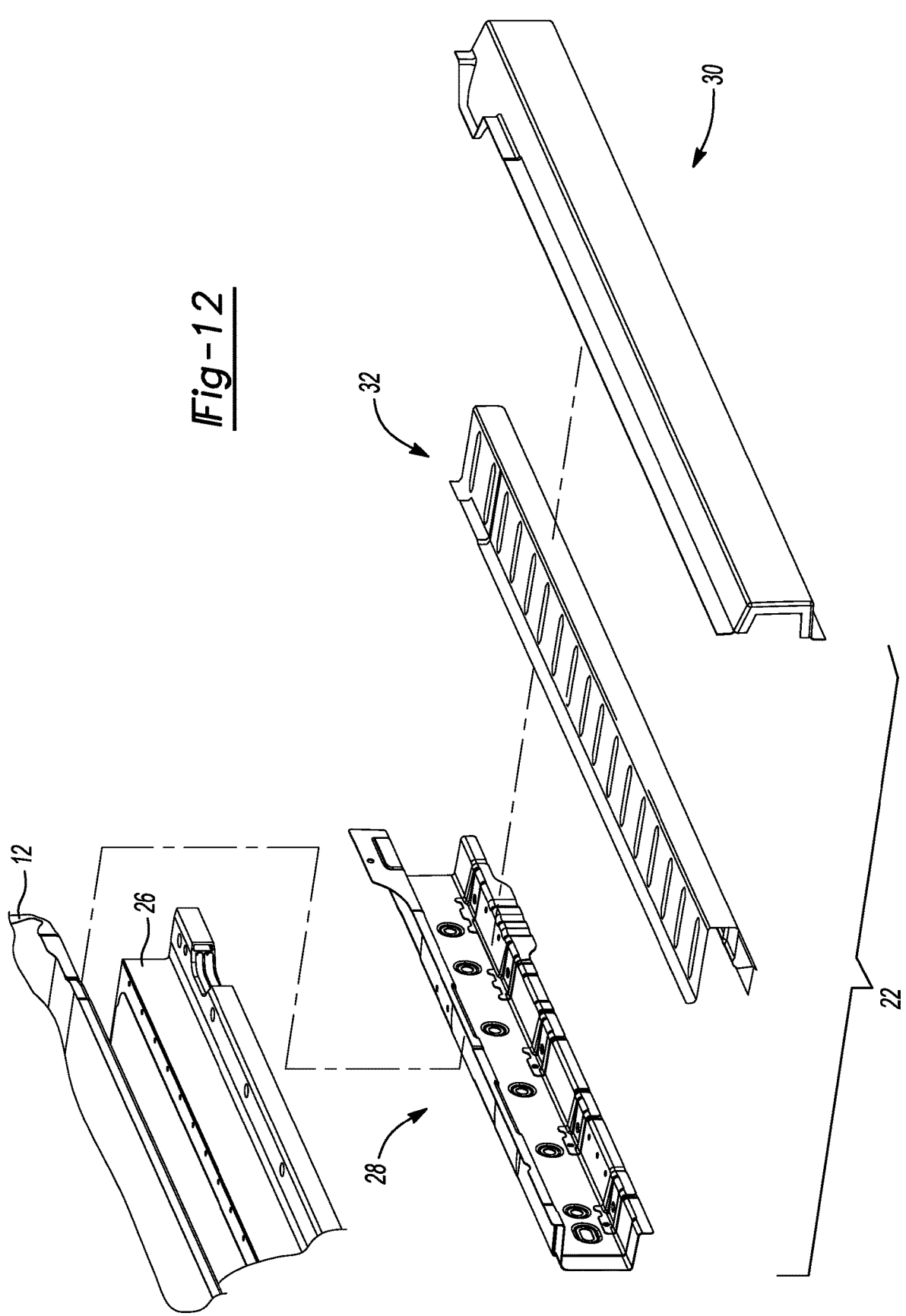
_Fig-12_

VEHICLE BODY SIDE SILL REINFORCEMENT PANEL

FIELD

The present disclosure relates generally to vehicle body side sills.

BACKGROUND

This section provides background information related to the present disclosure which is not necessarily prior art.

Vehicle side impact crashes occur when an object comes into contact with the side of a vehicle. Due to the relatively little amount space between the side of the vehicle and the passenger compartment as compared to the front or rear of a vehicle, side impact crashes are often severe, leading to injury or death to the occupants of the vehicle. A particularly dangerous side impact crash is a side pole crash which can occur when a vehicle travels sideways into a rigid object on the side of the road, such as for example an electric or telephone pole, a light pole, or a tree (collectively referred to as a "pole"). A side pole crash is a worst-case impact scenario in which the vehicle experiences concentrated intrusions and has the potential to cause severe injuries to the occupants. Because of the localized loading on the vehicle in a side impact crash, deformation of the vehicle can be very high and the side pole has the potential to penetrate far into the passenger compartment. Accordingly, vehicles need to be designed to protect the occupants during side impact crashes as part of various country regulatory and third-party star rating requirements.

Additionally, in battery electric vehicles, side impact crashes can present additional hazards to occupants of the vehicle. In many battery electric vehicles, the battery pack is located under the floor pan of the vehicle and between side sills or rocker panels located on the left and right sides of the vehicle. The high voltage battery pack needs to be protected during a side impact crash to protect the occupants of the vehicle from high voltage shock and/or a fire hazard. The vehicle body should be designed to absorb the impact energy within the space available throughout the length of the battery pack.

Reinforced side sills are employed to reduce the damage from side impact crashes. Existing side sill reinforcements include aluminum extrusions which are costly and do not necessarily achieve the desired crash performance.

Accordingly, there remains a need for improved side sill reinforcements that are configured to absorb the impact energy from a side impact crash, including concentrated side pole crashes, and that which reduce intrusions into the passenger compartment, and in the case of a battery electric vehicle, intrusions into the battery pack.

SUMMARY

This section provides a general summary of the disclosure, and is not a comprehensive disclosure of its full scope or all of its features.

In accordance with one aspect of the subject disclosure, a vehicle body is provided. The vehicle body includes a side sill. The side sill includes a side sill inner panel, a side sill outer panel, and a unitary side sill reinforcement panel located between the side sill inner panel and the side sill outer panel. The side sill reinforcement panel includes a first wall portion, wherein the first wall portion is coupled to the side sill outer panel, a second wall portion, wherein the second wall portion extends from the first wall portion away from the side sill outer panel toward the side sill inner panel, a third wall portion, wherein the third wall portion extends from the first wall portion away from the side sill outer panel toward the side sill inner panel, a fourth wall portion, wherein the fourth wall portion extends from the third wall portion, a first flange, wherein the first flange extends from the second wall portion and the first flange is coupled to the side sill inner panel, and a second flange, wherein the second flange extends from the fourth wall portion and the second flange is coupled to the side sill inner panel.

In accordance with one aspect of the subject disclosure, a vehicle body is provided. The vehicle body includes a side sill. The side sill includes a side sill inner panel, a side sill outer panel, and a side sill reinforcement panel located between the side sill inner panel and the side sill outer panel. The side sill reinforcement panel includes an impact region at the side sill outer panel, a first crush region extending from the impact region toward the side sill inner panel, a second crush region extending from the impact region toward the side sill inner panel, a first flange extending from the first crush region, and a second flange extending from the second crush region. At least a portion of the first flange and the second flange are coupled to the side sill inner panel.

In accordance with one aspect of the subject disclosure, a vehicle body is provided. The vehicle body includes an impact resistant side sill. The side sill includes a side sill inner panel including a first flange and a second flange, a side sill outer panel including a third flange and a fourth flange, and a side sill reinforcement panel located between the side sill inner panel and the side sill outer panel, the side sill reinforcement panel including a fifth flange and a sixth flange. The side sill has a closed polygonal shape in cross-section, wherein the first flange is coupled to the third flange and the sixth flange is disposed between and coupled to the second flange and the fourth flange, the fifth flange being positioned within the closed polygon shape and coupled to the side sill inner panel.

In accordance with one aspect of the subject disclosure, a vehicle body is provided. The vehicle body includes an impact resistant side sill. The side sill includes a side sill inner panel including a first flange and a second flange, a side sill outer panel including a third flange and a fourth flange, and a side sill reinforcement panel located between the side sill inner panel and the side sill outer panel, the side sill reinforcement panel including a fifth flange and a sixth flange. The side sill has a closed polygonal shape in cross-section, wherein the first flange is coupled to the third flange, the fifth flange and the sixth flange being positioned within the closed polygon shape and coupled to the side sill inner panel.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure.

FIG. 3 is a partial detail cutaway perspective view of a side sill having a first embodiment of a side sill reinforcement panel in accordance with the present disclosure;

FIG. 9 is a section view of the side sill reinforcement panel taken from line 9-9 in FIG. 6;

FIG. 10 is a section view of the side sill of FIG. 3;

FIG. 12 is an exploded perspective view of the side sill of FIG. 11;

Corresponding reference numerals indicate corresponding parts throughout the several views of the drawings.

DETAILED DESCRIPTION

Figure 1:
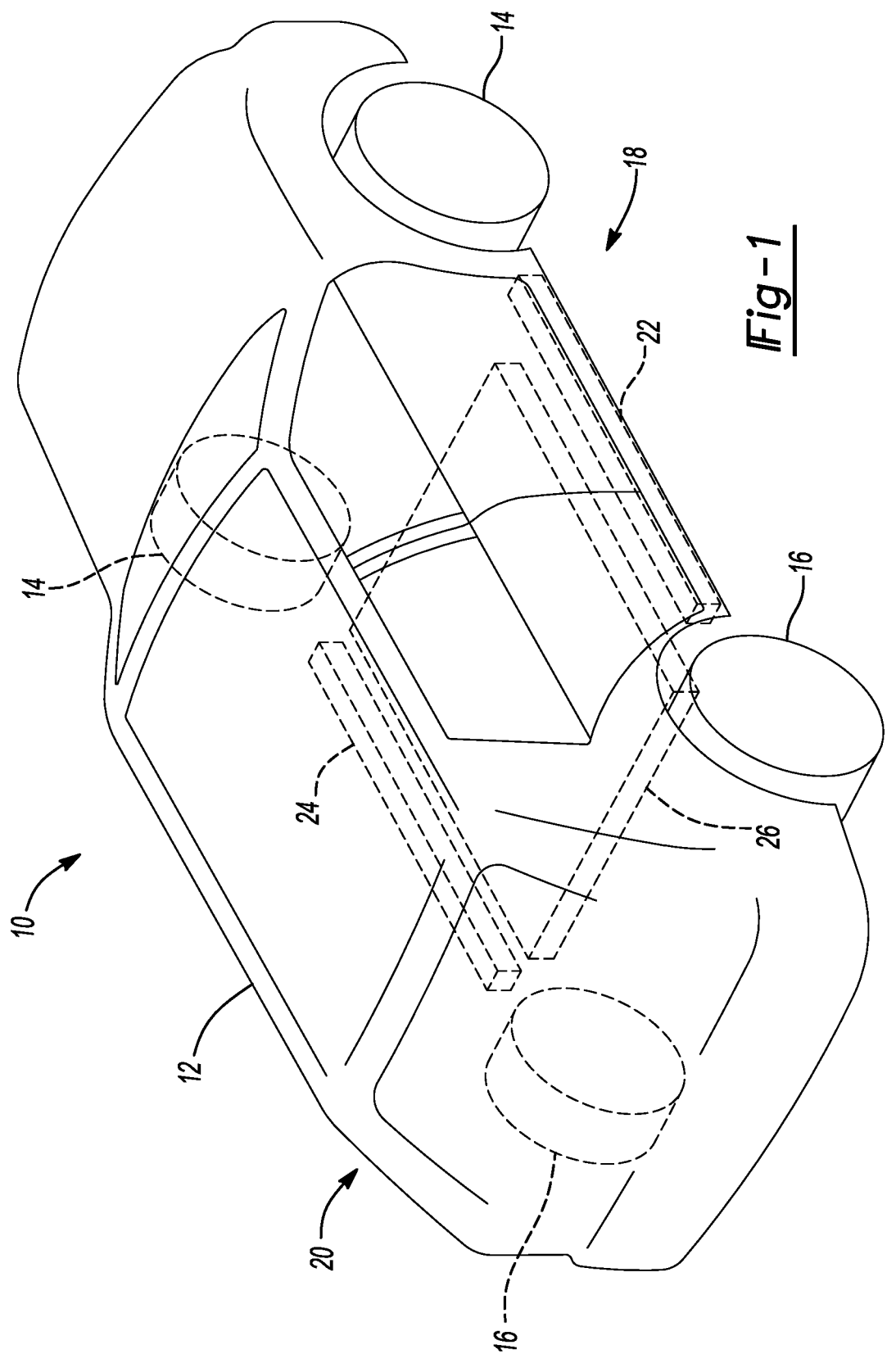
FIG. 1 is an illustration of an automobile having side sills in accordance with the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
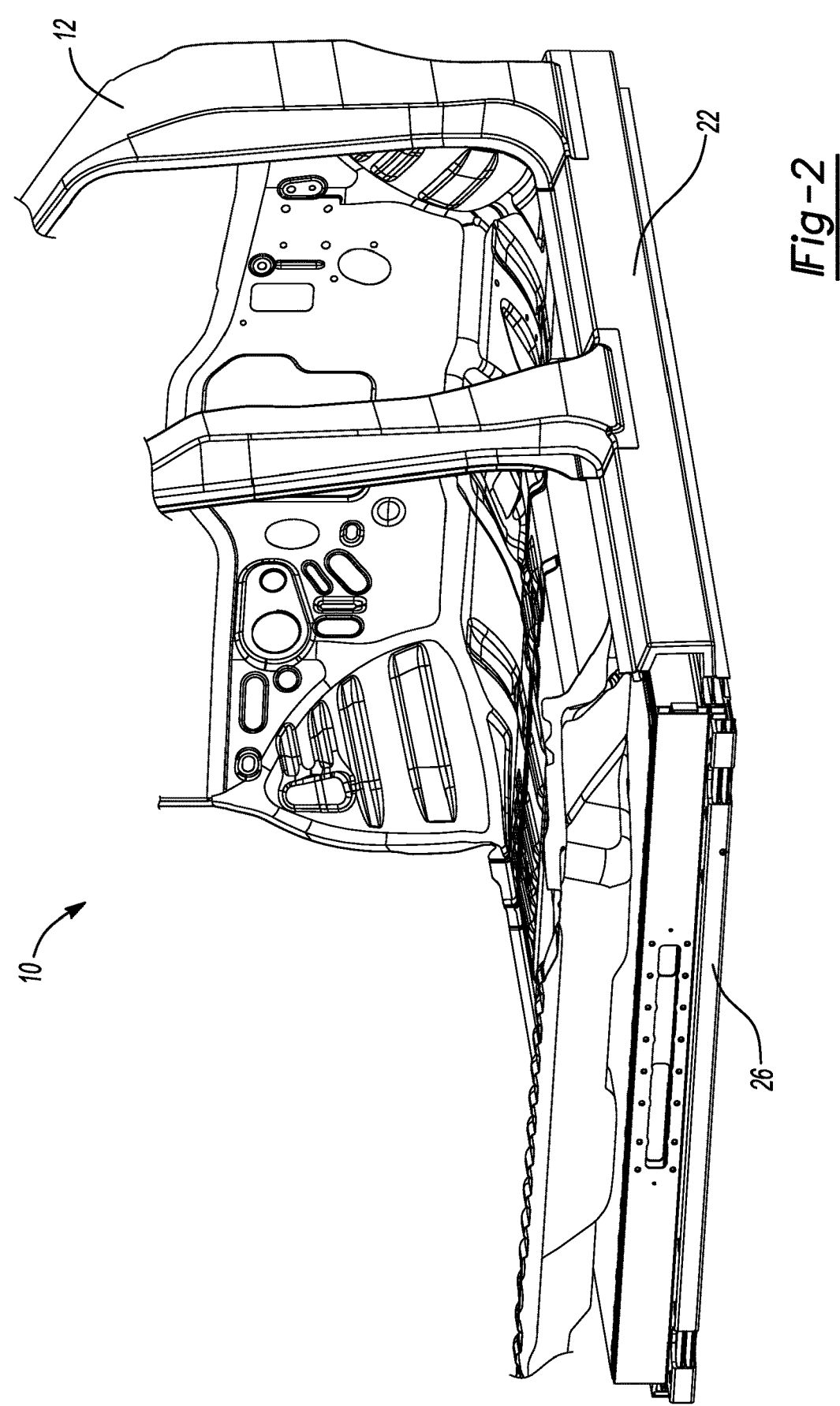
FIG. 2 is a is a partial cutaway perspective view of an automobile in accordance with the present disclosure.

Referring to FIG. 1, an exemplary vehicle 10 is illustrated. The vehicle 10 includes a vehicle body 12, a front set of wheels 14, and a rear set of wheels 16. The vehicle body 12 has a right side 18 and a left side 20 and includes a side sill 22 on the right side 18 of the vehicle body 12 and a side sill 24 on the left side 20 of the vehicle body 12. The side sill 22 is located in a lower portion of the right side 18 of the vehicle body 12 and between a right front wheel 14 and a right rear wheel 16. The side sill 24 is located in a lower portion of the left side 20 of the vehicle body 12 and between a left front wheel 14 and a left rear wheel 16. As shown in FIGS. 1 and 2, in some embodiments, the vehicle 10 further includes a battery pack 26 mounted to the underside of the vehicle body 12 and located transversely between the side sill 22 and the side sill 24. However, it will be understood that the side sill 22 described herein is not limited to vehicles having a battery pack and may be used in vehicles that do not include battery packs, including, but not limited to, vehicles having internal combustion engines and fuel cells. The structure and function of the side sill 24 may be the same or similar to the side sill 22, and therefore, will not be described again in detail. For example, the side sill 24 may be a mirror image of the side sill 22.

Referring now to FIGS. 3-10, an embodiment of the side sill 22 is described in greater detail. The side sill 22 includes a side sill inner panel 28, a side sill outer panel 30, and a side sill reinforcement panel 32. The side sill reinforcement panel 32 is located between the side sill inner panel 28 and the side sill outer panel 30. As described in greater detail below, preferably the side sill inner panel 28, the side sill outer panel 30, and the side sill reinforcement panel 32 are constructed of a steel alloy and the side sill reinforcement panel 32 is a unitary part formed of an uninterrupted sheet of a steel alloy. Accordingly, the side sill reinforcement panel 32 may be considered a one-piece part having a number of portions.

Figure 5:
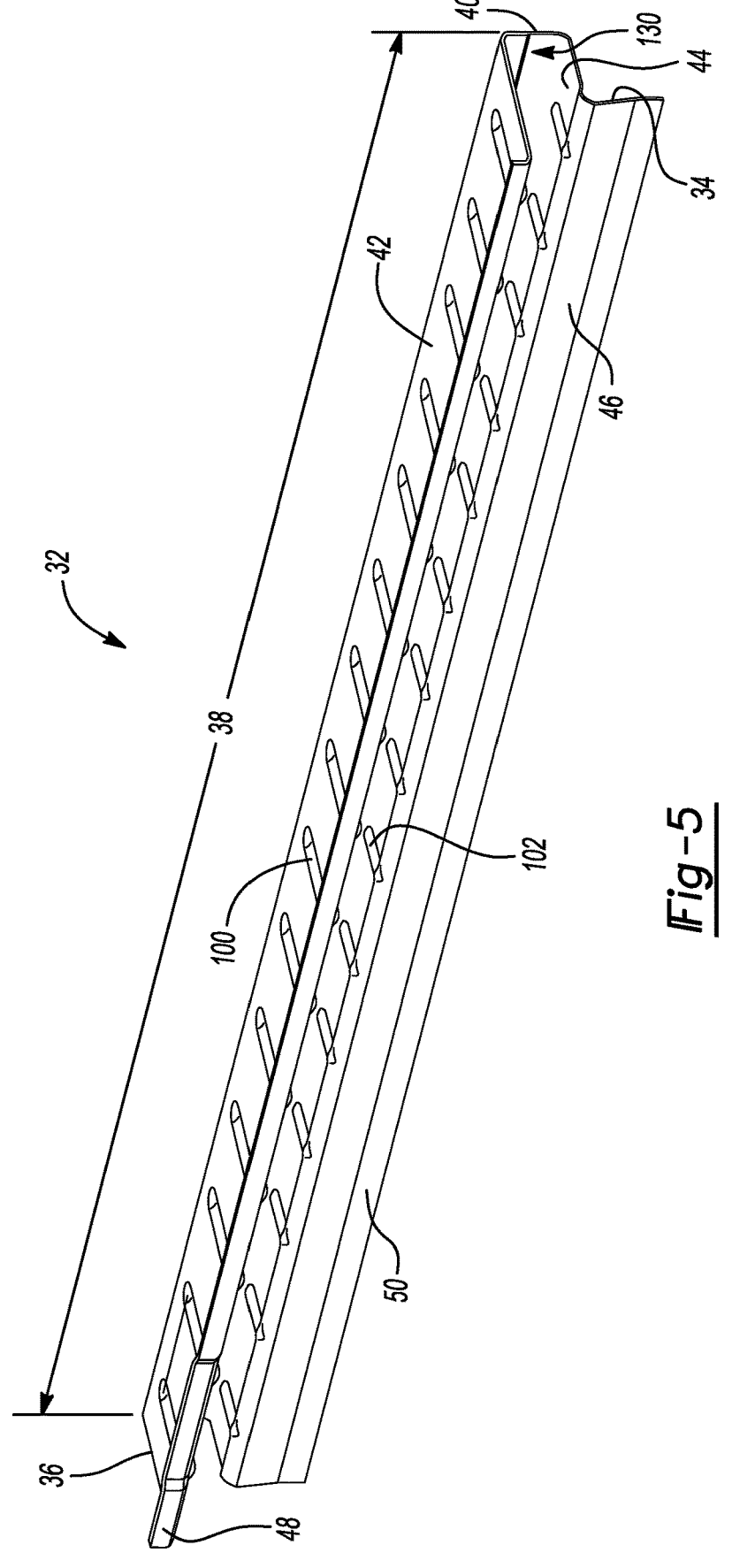
FIG. 5 is a perspective view of the side sill reinforcement panel of FIG. 3.
Figure 6:
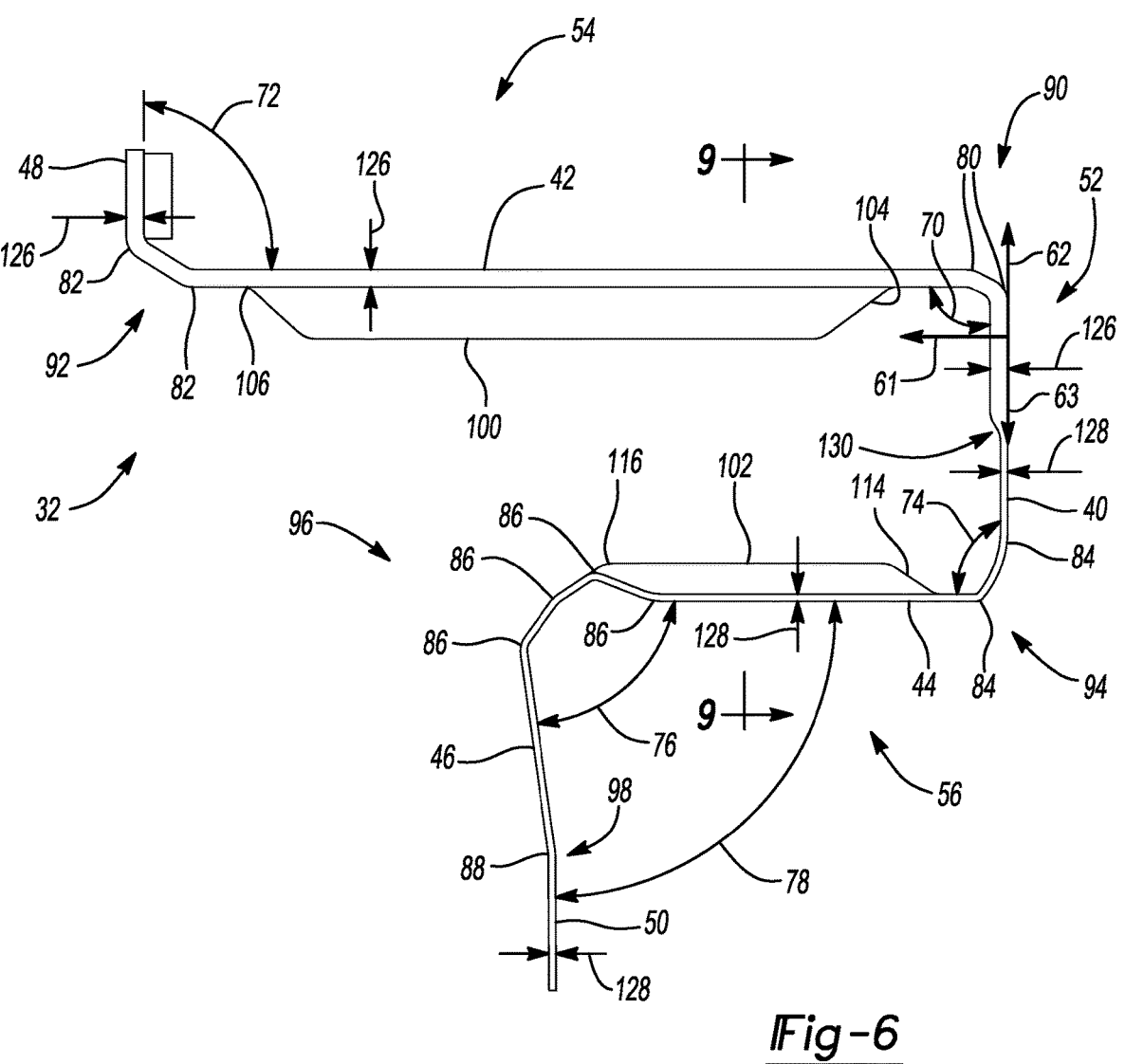
FIG. 6 is an end view of the side sill reinforcement panel of FIG. 3.
Figures 7, 8:
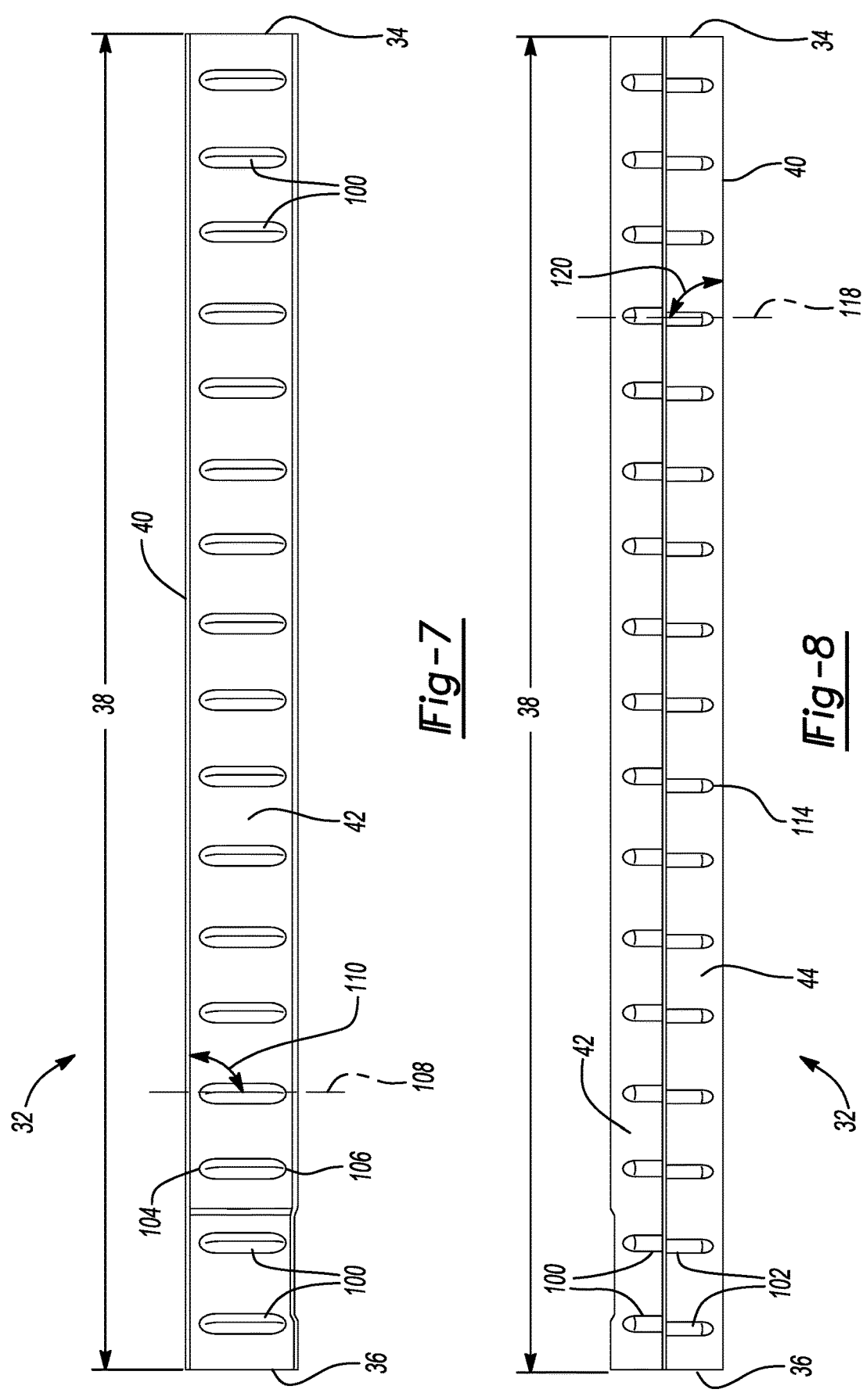
FIG. 7 is a top view of the side sill reinforcement panel of FIG. 3.
FIG. 8 is a bottom view of the side sill reinforcement panel of FIG. 3.

As shown more particularly in FIGS. 5 and 6, the side sill reinforcement panel 32 includes a first end 34, a second end 36, and a length 38 from the first end 34 to the second end 36. The side sill reinforcement panel 32 includes a first wall portion 40, a second wall portion 42, a third wall portion 44, a fourth wall portion 46, a first flange 48, and a second flange 50. The first wall portion 40, the second wall portion 42, the third wall portion 44, the fourth wall portion 46, the first flange 48, and the second flange 50 extend from the first end 34 to the second end 36 along the length 38.

The side sill reinforcement panel 32 has an impact region 52, a first crush region 54, and a second crush region 56. The impact region 52 includes the first wall portion 40, the first crush region 54 includes the second wall portion 42, and the second crush region 56 includes the third wall portion 44 and the fourth wall portion 46. The first wall portion 40 is located in the impact region 52. The second wall portion 42 is located in the first crush region 54, and the third wall portion 44 and the fourth wall portion 46 are located in the second crush region 56. The first crush region 54 and the second crush region 56 are configured to be deformed in a side pole crash. The first crush region 54 and the second crush region 56 are configured to absorb the energy from a side pole crash.

With specific reference to FIG. 6, various features of the side sill reinforcement panel 32 may be described with respect to the first wall portion 40, a first direction 61 perpendicular to the first wall portion 40, a second direction 62 extending along the first wall portion 40 perpendicular to the first direction 61, and a third direction 63 extending along the first wall portion 40 perpendicular to the first direction 61 and opposite to the second direction 62. The description of the features of the side sill reinforcement panel 32 with respect to the first wall portion 40, the first direction 61, the second direction 62, and the third direction 63 are exemplary and non-limiting. As an example, with respect to the vehicle 10, the first wall portion 40 may extend longitudinally along the vehicle 10, the first direction 61 may point toward the inside of the vehicle 10, the second direction 62 may point toward the top of the vehicle 10, and the third direction 63 may point toward the bottom of the vehicle 10. The length 38 of the side sill reinforcement panel 32 is parallel to the first wall portion 40, the first end 34 is perpendicular to the first wall portion 40, and the second end 36 is perpendicular to the first wall portion 40.

The second wall portion 42 is connected to and extends from the first wall portion 40 in the first direction 61. The second wall portion 42 is at a first angle 70 with respect to the first wall portion 40. The first angle 70 may range from about 80 degrees to about 100 degrees. In some embodiments, the first angle 70 is in a range from about 90 degrees to about 95 degrees. In some embodiments, the first angle 70 is about 90 degrees. In some embodiments, the first angle 70 is about 91 degrees. The terms "about" and "substantially" as used herein include reasonable variations from a specified value that are the result of manufacturing tolerances and/or may occur during manufacturing, such as for example the inclusion of draw angles and/or localized material thinning or thickening that are the result of one or more metal forming operations. For example, when used with respect to a stated angle, the terms "about" and "substantially" include +/−5 degrees with respect to the stated angle. For example, when used with respect to a stated orientation (i.e., parallel, perpendicular, horizontal, vertical, level), the terms "about" and "substantially" include +/−5 degrees with respect to the stated orientation (i.e., parallel, perpendicular, horizontal, vertical, level). Additionally, for example, when used with respect to a stated thickness, the terms "about" and "substantially" include +/−2 mm with respect to the stated thickness. These terms apply to the ranges described throughout this disclosure.

The first flange 48 is connected to and extends from the second wall portion 42 in the second direction 62. The first flange 48 is at a second angle 72 with respect to the second wall portion 42. The second angle 72 may range from about 30 degrees to about 330 degrees. In some embodiments, the second angle 72 may range from about 45 degrees to about 315 degrees. In some embodiments, the second angle 72 may range from about 60 degrees to about 300 degrees. In some embodiments, the second angle 72 may range from about 45 degrees to about 115 degrees. In some embodiments, the second angle 72 may range from about 60 degrees to about 120 degrees. In some embodiments, the second angle 72 may range from about 80 degrees to about 100 degrees. In some embodiments, the second angle 72 is about 90 degrees. In some embodiments, the second angle 72 may range from about 225 degrees to about 315 degrees. In some embodiments, the second angle 72 may range from about 240 degrees to about 300 degrees. In some embodiments, the second angle 72 may range from about 260 degrees to about 280 degrees. In some embodiments, the second angle 72 is about 270 degrees.

The third wall portion 44 is connected to and extends from the first wall portion 40 in the first direction 61. The third wall portion 44 is at a third angle 74 with respect to the first wall portion 40. The third angle 74 may range from about 80 degrees to about 100 degrees. In some embodiments, the third angle 74 is in a range from about 90 degrees to about 95 degrees. In some embodiments, the third angle 74 is about 90 degrees. In some embodiments, the third angle 74 is about 91 degrees.

The fourth wall portion 46 is connected to and extends from the third wall portion 44 in the third direction 63. The fourth wall portion 46 is at a fourth angle 76 with respect to the third wall portion 44. The fourth angle 76 may range from about 70 degrees to about 110 degrees. In some embodiments, the fourth angle 76 is in a range from about 80 degrees to about 100 degrees. In some embodiments, the fourth angle 76 is about 80 degrees. In some embodiments, the fourth angle 76 is about 82 degrees.

The second flange 50 is connected to and extends from the fourth wall portion 46 in the third direction 63. In some embodiments, the first flange 48 and the second flange 50 extend away from one another. The second flange 50 is at a fifth angle 78 with respect to the third wall portion 44. The fifth angle 78 may range from about 70 degrees to about 110 degrees. In some embodiments, the fifth angle 78 is in a range from about 80 degrees to about 100 degrees. In some embodiments, the fifth angle 78 is about 80 degrees. In some embodiments, the fifth angle 78 is about 90 degrees.

In some embodiments, the second wall portion 42 is parallel or substantially parallel to the third wall portion 44, the second wall portion 42 and the third wall portion 44 are perpendicular or substantially perpendicular to the first wall portion 40, and the first flange 48 and the second flange 50 are parallel or substantially parallel to the first wall portion 40 and perpendicular or substantially perpendicular to the second wall portion 42 and the third wall portion 44. In some embodiments, the first flange 48 and the second flange 50 extend in opposite directions away from one another.

With continued reference to FIG. 6, the side sill reinforcement panel includes one or more bends 80 between the first wall portion 40 and the second wall portion 42, one or more bends 82 between the second wall portion 42 and the first flange 48, one or more bends 84 between the first wall portion 40 and the third wall portion 44, one or more bends 86 between the third wall portion 44 and the fourth wall portion 46, and one or more bends 88 between the fourth wall portion 46 and the second flange 50. A first bend region 90 includes the one or more bends 80 between the first wall portion 40 and the second wall portion 42. A second bend region 92 includes the one or more bends 82 between the second wall portion 42 and the first flange 48. A third band region 94 includes the one or more bends 84 between the first wall portion 40 and the third wall portion 44. A fourth bend region 96 includes the one or more bends 86 between the third wall portion 44 and the fourth wall portion 46. And a fifth bend region 98 includes the one or more bends 88 between the fourth wall portion 46 and the second flange 50.

With particular reference to the fourth bend region 96, in some embodiments, one or more of the bends 86 have a bend axis on a first side of the third wall portion 44 between the third wall portion 44 and the second wall portion 42 and one or more of the bends 86 have a bend axis on a second side of the third wall portion 44 opposite the first side of the third wall portion 44. Accordingly, the bends 86 in the fourth bend region 96 may have a serpentine shape. This bends 86 of the fourth bend region 96 may be designed to alter the deformation characteristics of the fourth bend region 96, the third wall portion 44, and/or the fourth wall portion 46 during a side impact crash.

As shown in FIGS. 5-10, the exemplary side sill reinforcement panel 32 includes one or more strengthening elements. In one embodiment, the strengthening elements include one or more of ribs 100, 102. The strengthening elements provide more resistance to impact as compared to a flat or substantially flat second wall portion 42 and/or third wall portion 44, and therefore increase the crash performance of the side sill reinforcement panel 32.

The second wall portion 42 includes a population of ribs 100 extending and spaced apart along the length 38 of the side sill reinforcement panel 32. Each rib 100 has a first end 104, a second end 106, and major axis 108 at an angle 110 with respect to the first wall portion 40 of the side sill reinforcement panel 32. The angle 110 may range from about 30 degrees to about 150 degrees. In some embodiments, the angle 110 is 30 degrees. In some embodiments, the angle 110 is 45 degrees. In some embodiments, the angle 110 is 60 degrees. In some embodiments, the angle 110 is 90 degrees. In some embodiments, the angle 110 is 120 degrees. In some embodiments, the angle 110 is 135 degrees. In some embodiments, the angle 110 is 150 degrees. In some embodiments, one or more of the first end 104 and the second end 106 of the ribs 100 are rounded or chamfered.

The third wall portion 44 includes a population of ribs 102 extending and spaced apart along the length 38 of the side sill reinforcement panel 32. Each rib 102 has a first end 114, a second end 116, and major axis 118 at an angle 120 with respect to the first wall portion 40 of the side sill reinforcement panel 32. The angle 120 may range from about 30 degrees to about 150 degrees. In some embodiments, the angle 120 is 30 degrees. In some embodiments, the angle 120 is 45 degrees. In some embodiments, the angle 120 is 60 degrees. In some embodiments, the angle 120 is 90 degrees. In some embodiments, the angle 120 is 120 degrees. In some embodiments, the angle 120 is 135 degrees. In some embodiments, the angle 120 is 150 degrees. In some embodiments, one or more of the first end 114 and the second end 116 of the ribs 102 are rounded or chamfered.

As shown in FIGS. 5, 6, and 10, the second end 116 of the ribs 102 on the third wall portion 44 terminates in the fourth bend region 96 between the third wall portion 44 and the fourth wall portion 46. By having the ribs 102 terminating in the fourth bend region 96, this further increases the structural strength of the third wall portion 44.

Although the ribs 100 in the second wall portion 42 and the ribs 102 in the third wall portion 44 are shown as uniformly spaced along the second wall portion 42 and the third wall portion 44, in some embodiments, the ribs 100 and 102 are not uniformly spaced along one or more of the second wall portion 42 and the third wall portion 44. The distance between the ribs 100 on the second wall portion 42 can be increased or decreased according to the desired crash performance of the side sill reinforcement panel 32. Likewise, distance between the ribs 102 on the third wall portion 44 can be increased or decreased according to the desired crash performance of the side sill reinforcement panel 32. Additionally, the number of ribs 100, 102 can be increased or decreased according to the desired crash performance of the side sill reinforcement panel 32. For example, in areas where additional structural strength is desired, additional ribs 100, 102 more closely spaced together may be provided.

With reference to FIG. 9, the ribs 100 have a depth 122 from the second wall portion 42. The ribs 100 have an isosceles trapezoid shape in cross section perpendicular to the major axis 108 of the rib 100. In some embodiments, the ribs 100 may have other shapes in cross section perpendicular to the major axis 108 of the rib 100 including, but not limited to, a semicircular shape, a triangular shape, a trapezoid, or a rectangular shape. The ribs 102 have a depth 124 from the second wall portion 42. The ribs 102 have a triangular shape in cross section perpendicular to the major axis 118 of the rib 102. In some embodiments, the ribs 102 may have other shapes in cross section perpendicular to the major axis 118 of the rib 102 including, but not limited to, a semicircular shape, an isosceles trapezoid shape, a trapezoid shape, or a rectangular shape.

The depth 122 and/or the shape of the ribs 100 and the depth 124 and/or the shape of the ribs 102 may be designed according to the desired crash performance of the side sill reinforcement panel 32. For example, the ribs 100 on the second wall portion 42 are configured to provide higher load carrying capacity and energy absorption. The depth 122 is greater than the depth 124; however, in some embodiments, the depth 122 is equal to the depth 124, and other embodiments, the depth 122 is less than the depth 124. When assembled in the vehicle, the second wall portion 42 aligns with the floor pan 162 (see FIG. 10) and vehicle cross members to offer better reaction from the beginning of the impact and to slow down the speed of the vehicle 10. The size, shape, and/or depth 122, 124 of the ribs 100 and/or the ribs 102 can be varied based on the dimensions of the side sill reinforcement panel 32 and/or the side sill 22 and the reaction force and intrusion requirements across the length 38 of the side sill reinforcement panel 32 during the side impact especially in the pole impact where the loading is very locally concentrated.

In some embodiments, the strengthening elements include, but are not limited to, channels, corrugations, folds, beads. Preferably, the strengthening elements, such as the ribs 100, 102, are integrally formed on the second wall portion 42 and the third wall portion 44, respectively, of the side sill reinforcement panel 32. In other embodiments, the strengthening elements may be separately formed and then coupled to the side sill reinforcement panel 32, for example, by one or more welds and/or adhesives. For example, the strengthening elements may include additional bars or strips of metal coupled to one or more of the second wall portion 42 and the third wall portion 44.

Manufacture of the Side Sill Reinforcement Panel 32

Having described the features of an exemplary side sill reinforcement panel 32, additional details of the material and manufacture of the side sill reinforcement panel 32 are described. In some embodiments, the side sill reinforcement panel 32 is formed from sheet metal. For example, the side sill reinforcement panel 32 is formed from DP980 steel. Preferably, the side sill reinforcement panel 32 is formed from a single sheet metal blank, wherein the sheet metal blank is a single tailor rolled blank of sheet metal. The tailor rolled blank includes a first thickness and a second thickness, wherein the second thickness is less than the first thickness. In some embodiments, the single sheet metal blank is a tailor welded blank, wherein two precursor sheets of metal with two different thicknesses are tailor welded together to form a single sheet metal blank. Accordingly, the first wall portion 40, second wall portion 42, third wall portion 44, fourth wall portion 46, first flange 48, and the second flange 50 are integrally formed and make a one-piece or unitary side sill reinforcement panel 32.

The side sill reinforcement panel 32 is formed from the sheet metal blank through one or more metal forming and/or stamping operations. For example, in some embodiments, the side sill reinforcement panel 32 is made by a crash forming operation on the sheet metal blank. In other embodiments, the side sill reinforcement panel 32 is made by a draw forming operation on the sheet metal blank. In other embodiments, the side sill reinforcement panel 32 is made by a hydroforming operation on the sheet metal blank. In yet other embodiments, the side sill reinforcement panel 32 is made by a brake forming operation on the sheet metal blank. One or more pre- and post-forming operations on the sheet metal blank may be utilized to achieve the finished side sill reinforcement panel 32 without departing from the scope of the disclosure.

The tailor rolled or tailor welded sheet metal blank is oriented such that the first thickness of the blank forms the first flange 48, the first second wall portion 42, and at least a portion of the first wall portion 40, and the second thickness of the blank forms the second flange 50, the fourth wall portion 46, the third wall portion 44, and at least a portion of the first wall portion 40. Thus, as shown in FIGS. 6 and 9, the first flange 48 and the second wall portion 42 have a first thickness 126 and the third wall portion 44, the fourth wall portion 46, and the second flange 50 have a second thickness 128, wherein the second thickness 128 is less than the first thickness 126. A first portion of the first wall portion 40 has the first thickness 126 and a second portion of the first wall portion 40 has the second thickness 128. As shown in FIGS. 5, 6, 9, and 10, a transition zone 130 between the first thickness 126 and the second thickness 128 is located on the first wall portion 40. The transition zone 130 extends parallel along the length 38 of the side sill reinforcement panel 32. In some embodiments, the transition zone 130 is located midway on the first wall portion 40 between the second wall portion 42 and the third wall portion 44. Moreover, as shown in FIG. 6, the change in thickness from the first thickness 126 to the second thickness 128 in transition zone 130 is located in the first wall portion 40 on the same side of the first wall portion 40 as the second wall portion 42, the third wall portion 44, the fourth wall portion 46, the first flange 48, and the second flange 50.

As noted above, when assembled into a vehicle 10, the second wall portion 42 is aligned with the floor pan 162 and cross members of the vehicle 10. As such, the second wall portion 42 is designed to carry more of the load of a side impact than the third wall portion 44. Therefore, the first thickness 126 is preferably greater than the second thickness 128. Moreover, the reduced second thickness 128 provides weight savings of the side sill reinforcement panel 32.

The first thickness 126 may range from about 1.5 mm to about 3.0 mm. In some embodiments, the first thickness 126 may range from about 2.0 mm to about 2.5 mm. Preferably, in some embodiments, the first thickness 126 is 2.2 mm. The second thickness 128 may range from about 1.0 mm to about 1.5 mm. In some embodiments, the second thickness 128 may range from about 1.2 mm to about 1.4 mm. Preferably, in some embodiments, the second thickness 128 is 1.4 mm. The ranges and values of the first thickness 126 and the second thickness 128 are exemplary. The first thickness 126 and the second thickness 128 can be increased or decreased according to the desired crash performance of the side sill reinforcement panel 32.

Side Sill Inner Panel

Figure 4:
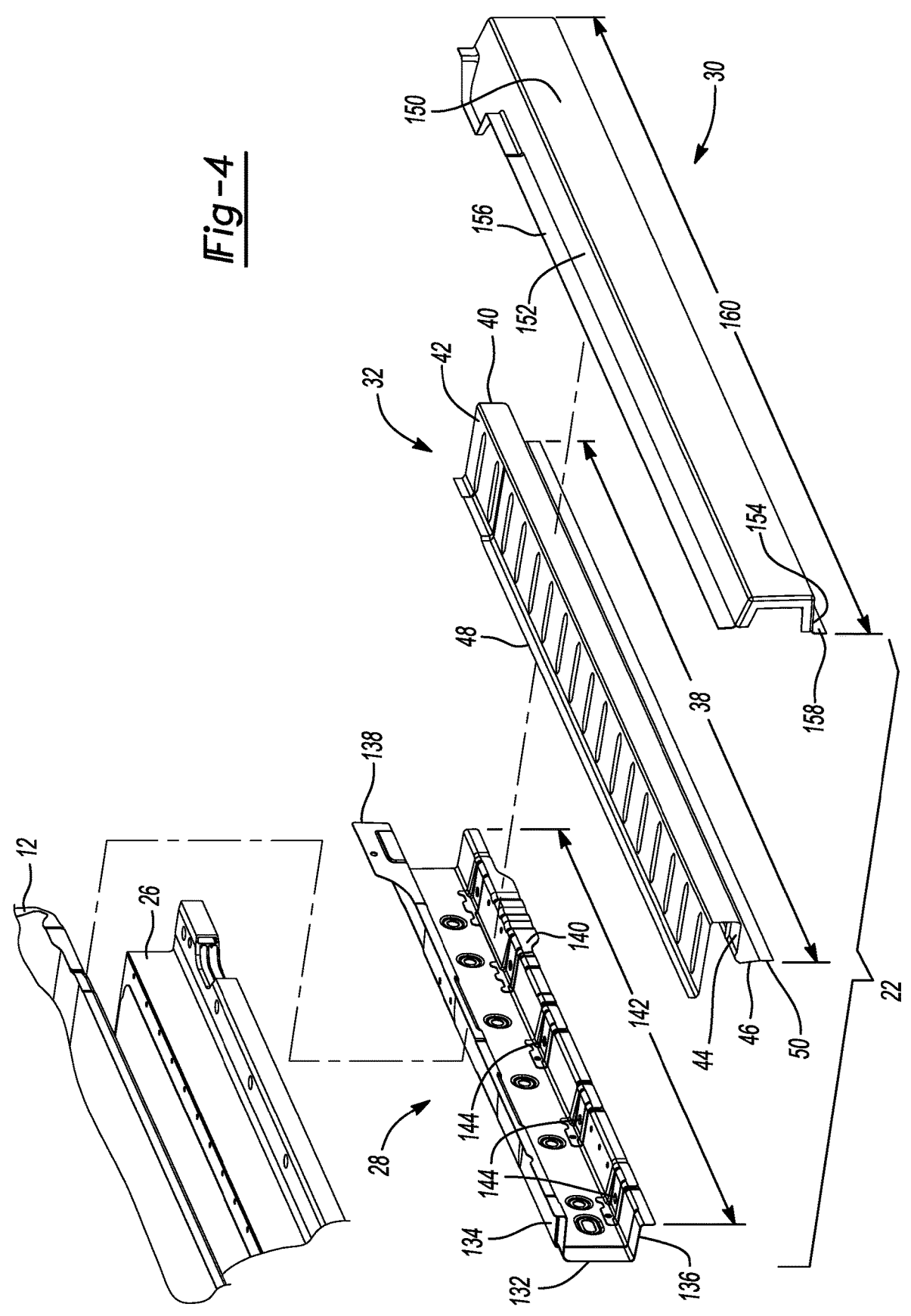
FIG. 4 is an exploded perspective view of the side sill of FIG. 3.

With reference to FIGS. 4 and 10, the side sill inner panel 28 includes a first inner wall 132, a second inner wall 134 connected to and extending from the first inner wall 132, a third inner wall 136 connected to and extending from the first inner wall 132, a first inner flange 138 connected to and extending from the second inner wall 134, and a second inner flange 140 connected to and extending from the third inner wall 136. The first inner wall 132, the second inner wall 134, and the third inner wall 136 are oriented to provide the side sill inner panel 28 with a generally C-shape in cross-section. Additionally, in some embodiments, the first inner flange 138 and the second inner flange 140 extend away from each other, with the first inner flange 138 extending in a first direction and the second inner flange 140 extending in a second direction opposite the first direction. In some embodiments, the first inner flange 138 and the second inner flange 140 extend toward one another. Preferably, the side sill inner panel 28 is formed from steel or an alloy thereof.

As shown in FIG. 4, the side sill inner panel 28 has a length 142. In some embodiments, the length 142 of the side sill inner panel 28 is equal to the length 38 of the side sill reinforcement panel 32. In some embodiments, the length 142 of the side sill inner panel 28 is less than the length 38 of the side sill reinforcement panel 32. In other embodiments, the length 142 of the side sill inner panel 28 is greater than the length 38 of the side sill reinforcement panel 32. Additionally, the side sill inner panel 28 may include additional features. For example, with continued reference to FIG. 4, the side sill inner panel 28 includes one or more holes 144 in the third inner wall 136 and spaced apart along the length 142 of the side sill inner panel 28. In vehicles 10 with a battery pack 26, fasteners, such as studs 146 (see FIG. 10), extend through the holes 144 of the side sill inner panel 28 and corresponding holes in the battery pack 26 and nuts 148 (see FIG. 10) are threaded onto the studs 146 to secure the battery pack 26 to the vehicle 10.

Side Sill Outer Panel

With reference to FIGS. 4 and 10, the side sill outer panel 30 includes a first outer wall 150, a second outer wall 152 connected to and extending from the first outer wall 150, a third outer wall 154 connected to and extending from the first outer wall 150, a first outer flange 156 connected to and extending from the second outer wall 152, and a second outer flange 158 connected to and extending from the third outer wall 154. The first outer wall 150, the second outer wall 152, and the third outer wall 154 are oriented to provide the side sill outer panel 30 with a generally C-shape in cross section. Additionally, in some embodiments, the first outer flange 156 and the second outer flange 158 extend away from each other, with the first outer flange 156 extending in a first direction and the second outer flange 158 extending in a second direction opposite the first direction. In some embodiments, the first outer flange 156 and the second outer flange 158 extend toward one another. Preferably, the side sill outer panel 30 is formed from steel or an alloy thereof.

As shown in FIG. 4, the side sill outer panel 30 has a length 160. In some embodiments, the length 160 of the side sill outer panel 30 is equal to the length 38 of the side sill reinforcement panel 32. In some embodiments, the length 160 of the side sill outer panel 30 is less than the length 38 of the side sill reinforcement panel 32. In other embodiments, the length 160 of the side sill outer panel 30 is greater than the length 38 of the side sill reinforcement panel 32.

In some embodiments, at least a portion of the side sill outer panel 30 is a class-A surface. In some embodiments, additional structural and/or cosmetic body panels may be coupled to the side sill outer panel 30.

Assembly of Side Sill

With reference to FIG. 10, the side sill inner panel 28, side sill outer panel 30, and the side sill reinforcement panel 32 cooperate to form the side sill 22. The side sill reinforcement panel 32 is located between and coupled to the side sill inner panel 28 and side sill outer panel 30. The first flange 48 of the side sill reinforcement panel 32 is coupled to the first inner wall 132 of the side sill inner panel 28 and the first wall portion 40 of the side sill reinforcement panel 32 is coupled to the first outer wall 150 of the side sill outer panel 30. The second flange 50 of the side sill reinforcement panel 32 is sandwiched between the second inner flange 140 of the side sill inner panel 28 and the second outer flange 158 of the side sill outer panel 30, and the second flange 50 of the side sill reinforcement panel 32 is coupled to one or more of the second inner flange 140 of the side sill inner panel 28 and the second outer flange 158 of the side sill outer panel 30. In some embodiments, second flange 50 of the side sill reinforcement panel 32 is coupled only to the second inner flange 140 of the side sill inner panel 28. In some embodiments, second flange 50 of the side sill reinforcement panel 32 is coupled only to the second outer flange 158 of the side sill outer panel 30. In some embodiments, the second flange 50 of the side sill reinforcement panel 32 is coupled to both the second inner flange 140 of the side sill inner panel 28 and the second outer flange 158 of the side sill outer panel 30.

With continued reference to FIG. 10, the first inner flange 138 of the side sill inner panel 28 is coupled to the first outer flange 156 of the side sill outer panel 30. In some embodiments, one or more additional panels may be sandwiched between and/or coupled to the first inner flange 138 of the side sill inner panel 28 is coupled to the first outer flange 156 of the side sill outer panel 30. The side sill 22 has a closed polygonal shape in cross-section with the first flange 48 being positioned within the closed polygonal shape and coupled to the side sill inner panel 28. Preferably, the second wall portion 42 of the side sill reinforcement panel 32 is aligned with the floor pan 162 of the vehicle body 12.

The side sill reinforcement panel 32 is coupled to the side sill inner panel 28 and side sill outer panel 30 by one or more coupling devices, including but not limited to bolts, welds, structural adhesives, and rivets. For example, in some embodiments, the first flange 48 of the side sill reinforcement panel 32 is coupled to the first inner wall 132 of the side sill inner panel 28 by one or more spot welds and structural adhesive placed between the first flange 48 and the first inner wall 132. The first wall portion 40 of the side sill reinforcement panel 32 is coupled to the first outer wall 150 of the side sill outer panel 30 by one or more spot welds and structural adhesive placed between the first wall portion 40 and the first outer wall 150. The second flange 50 of the side sill reinforcement panel 32 is coupled to one or more of the second inner flange 140 of the side sill inner panel 28 and the second outer flange 158 of the side sill outer panel 30 by one or more spot welds and structural adhesive placed between one or more of the second flange 50 and the second inner flange 140 and the second flange 50 and the second outer flange 158. The spot welds are configured to hold the side sill reinforcement panel 32, the side sill inner panel 28, and the side sill outer panel 30 together while the structural adhesive cures.

Moreover, as shown in FIG. 10, because the change in thickness from the first thickness 126 to the second thickness 128 in transition zone 130 is located in the first wall portion 40 opposite the first outer wall 150 of the side sill outer panel 30, the contact surface between the first wall portion 40 and the first outer wall 150 can be increased.

When assembled, the impact region 52 of the side sill reinforcement panel 32 is at the side sill outer panel 30, the first crush region 54 extends from the impact region 52 toward the side sill inner panel 28, and the second crush region 56 extends from the impact region 52 toward the side sill inner panel 28.

Orientation on Vehicle

When the side sill 22 is assembled into the vehicle 10 and the vehicle 10 is level longitudinally and transversely (e.g., on a level surface or ground), the first wall portion 40 of the side sill reinforcement panel 32 is vertical or substantially vertical, the second wall portion 42 of the side sill reinforcement panel 32 is horizontal or substantially horizontal, the third wall portion 44 of the side sill reinforcement panel 32 is horizontal or substantially horizontal, and the transition zone 130 is horizontal or substantially horizontal.

Alternative Embodiment of Side Sill Reinforcement Panel

Referring now to FIGS. 11-17, an alternative embodiment of a side sill reinforcement panel 32 is described. The side sill reinforcement panel 32 has an impact region 52, a first crush region 54, and a second crush region 56. In some embodiments, the side sill reinforcement panel 32 includes a first wall portion 40, a second wall portion 42, a third wall portion 44, a fourth wall portion 46, a first flange 48, and a second flange 50. The side sill reinforcement panel 32 includes strengthening elements, such as ribs 100, 102 formed on the second wall portion 42 and the third wall portion 44, respectively, as described herein. The side sill reinforcement panel 32 shown in FIGS. 11-17 may be substantially the same as the side sill reinforcement panel 32 shown in FIGS. 3-10, except for the angle of the second flange 50 and additional features on the second flange 50.

Figure 13:
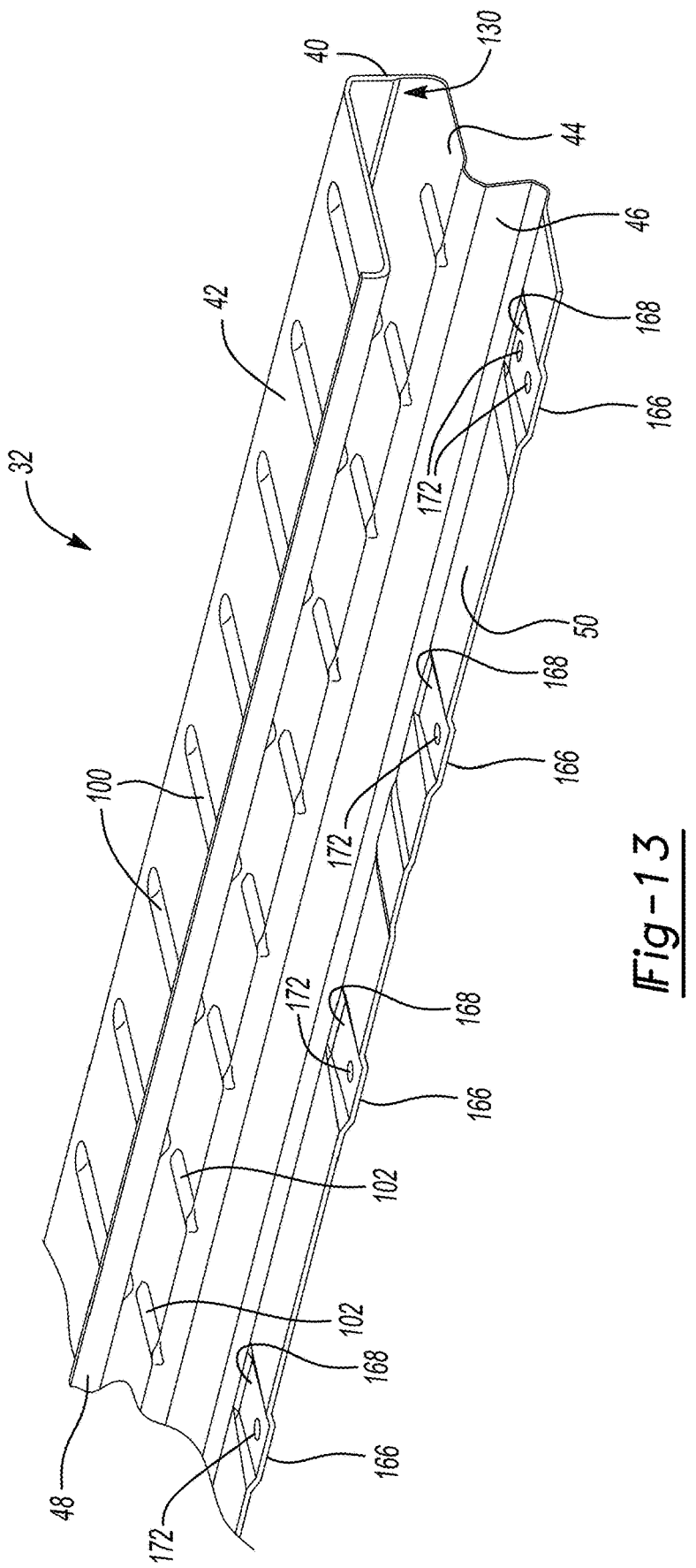
FIG. 13 is a perspective view of the side sill reinforcement panel of FIG. 11.
Figure 14:
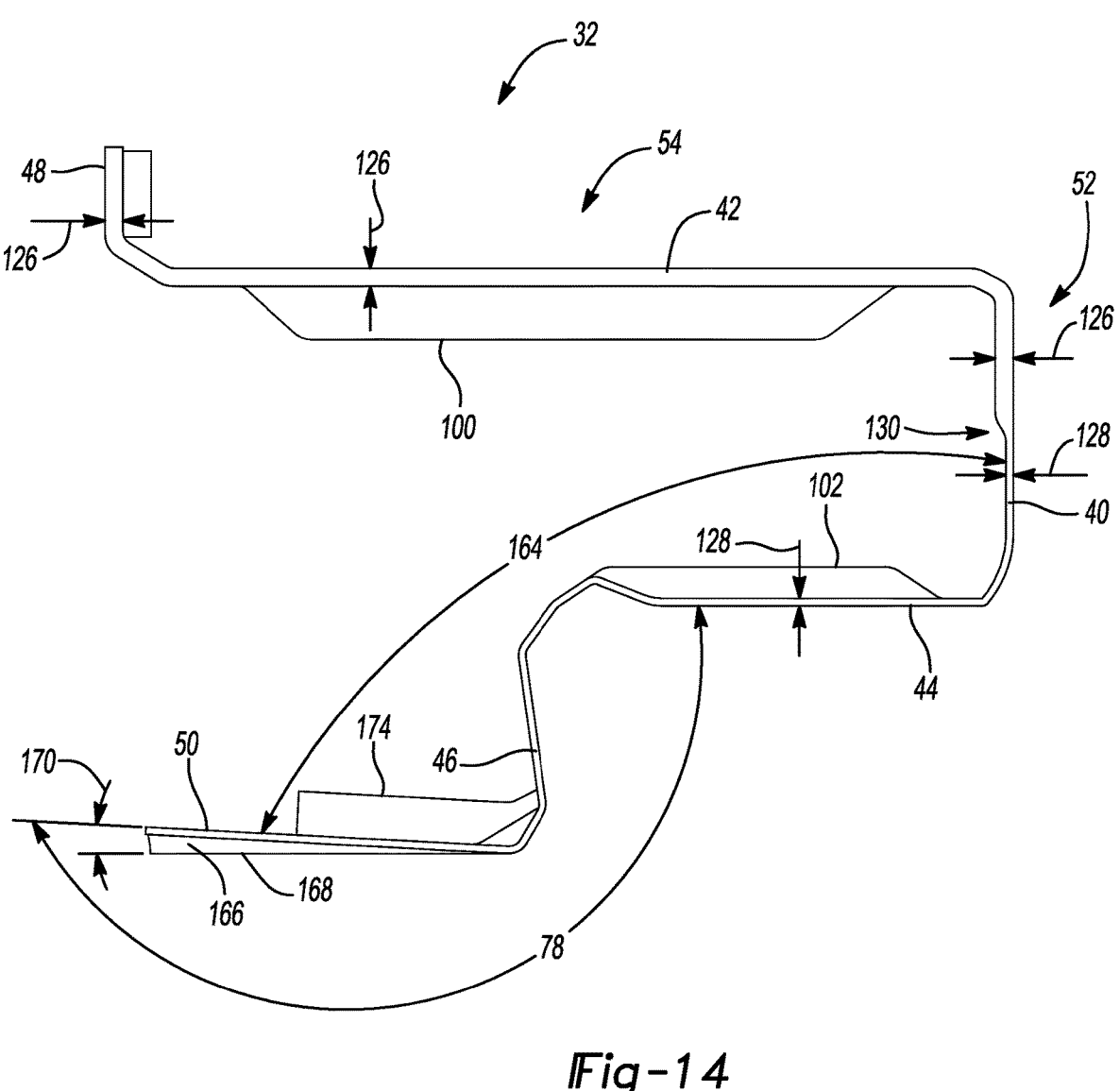
FIG. 14 is an end view of the side sill reinforcement panel of FIG. 11.

As shown in FIGS. 13 and 14, the second flange 50 is second flange 50 is connected to and extends from the first wall portion 40 in the first direction 61. The second flange 50 is at a fifth angle 78 with respect to the third wall portion 44. The fifth angle 78 may range from about 160 degrees to about 220 degrees. In some embodiments, the fifth angle 78 is from about 170 degrees to about 210 degrees. In some embodiments, the fifth angle 78 is from about 175 degrees to about 205 degrees. In some embodiments, the fifth angle 78 is from about 175 degrees to about 200 degrees. In some embodiments, the fifth angle 78 is from about 175 degrees to about 185 degrees. In some embodiments, the fifth angle 78 is about 177 degrees. In some embodiments, the fifth angle 78 is about 180 degrees.

Alternatively, the angle of the second flange 50 may be measured as a sixth angle 164 with respect to the first wall portion 40. The sixth angle 164 may range from about 110 degrees to about 50 degrees. In some embodiments, the sixth angle 164 is from about 110 degrees to about 60 degrees. In some embodiments, the sixth angle 164 is from about 105 degrees to about 65 degrees. In some embodiments, the sixth angle 164 is from about 100 degrees to about 70 degrees. In some embodiments, the sixth angle 164 is from about 95 degrees to about 85 degrees. In some embodiments, the sixth angle 164 is about 85 degrees. In some embodiments, the sixth angle 164 is about 90 degrees.

Figures 15, 16:
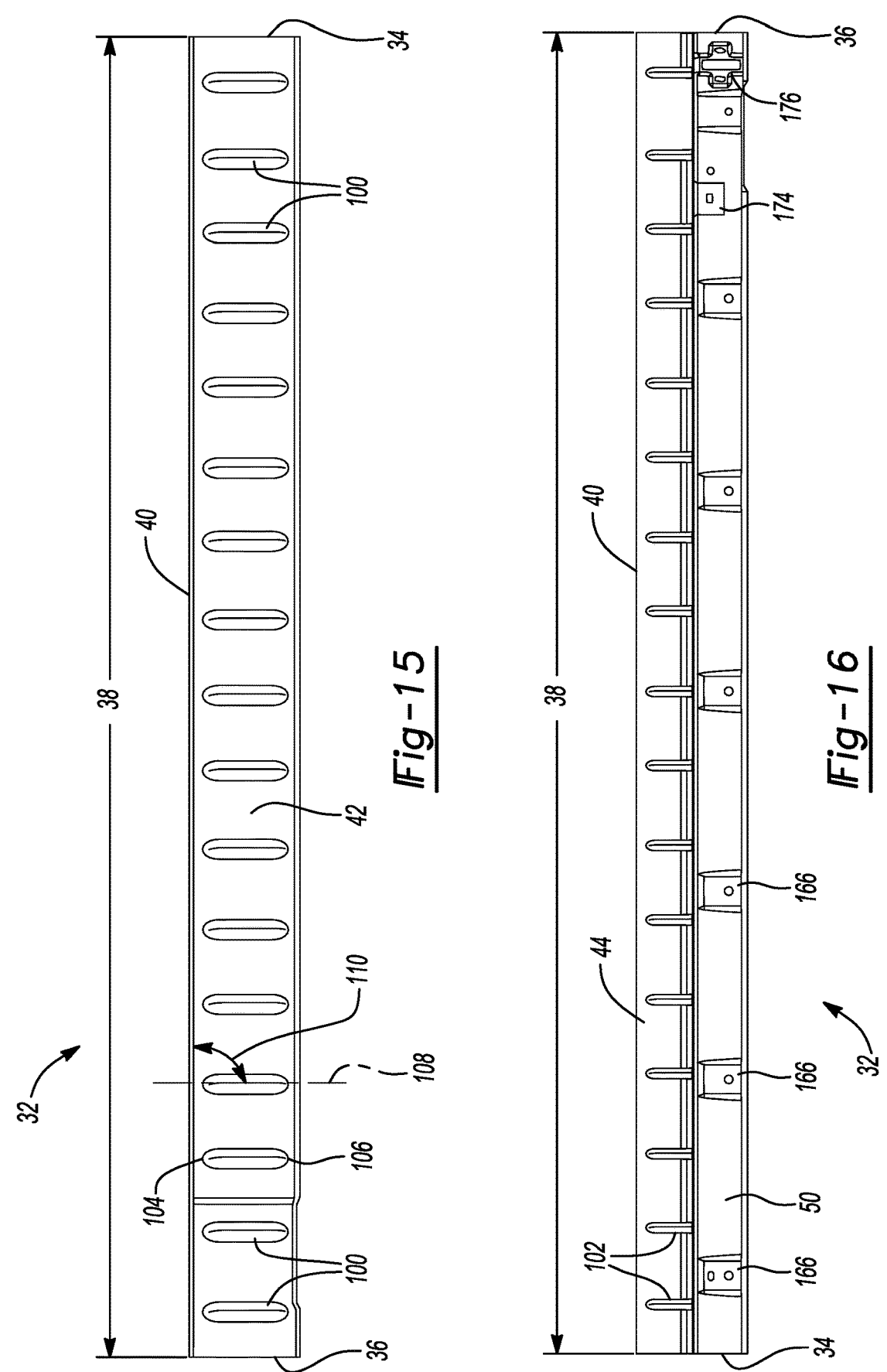
FIG. 15 is a top view of the side sill reinforcement panel of FIG. 11.
FIG. 16 is a bottom view of the side sill reinforcement panel of FIG. 3.

Additionally, with reference to FIGS. 13, 14, and 16, the side sill reinforcement panel 32 includes one or more integrated brackets 166 formed into the second flange 50 and extending and spaced apart along the length 38 of the side sill reinforcement panel 32. The brackets 166 may have a bracket wall portion 168 at a seventh angle 170 with respect to the second flange 50. The seventh angle 170 may range from about 1 degrees to about 10 degrees. In some embodiments, the seventh angle 170 is from about 3 degrees to about 7 degrees. In some embodiments, the seventh angle 170 is about 5 degrees. In some embodiments, the seventh angle 170 is about 3 degrees. In some embodiments, the seventh angle 170 is about 3.5 degrees.

Each bracket 166 includes one or more holes 172. The one or more holes 172 are located in the bracket wall portion 168. The integrated brackets 166 are configured to mate with corresponding features in the side sill inner panel 28 and the one or more holes 172 are configured to be aligned with the one or more holes 144 in the side sill inner panel 28 to permit fasteners to extend through the holes 172 of the side sill reinforcement panel 32 and the holes 144 in the side sill inner panel 28. As noted above, in vehicles 10 with a battery pack 26, the fasteners, such as studs 146 (see FIG. 17), extend through the holes 172 of the side sill reinforcement panel 32, the holes 144 of the side sill inner panel 28, and corresponding holes in the battery pack 26 and nuts 148 (see FIG. 17) are threaded onto the studs 146 to secure the battery pack 26 to the vehicle 10. The integrated brackets 166 eliminate the use of separate brackets used to secure the battery pack 26 to the vehicle 10, resulting in weight savings and cost savings.

The side sill reinforcement panel 32 may include additional integrated brackets 174, 176 used for mounting additional components (not shown) to the vehicle 10. These integrated brackets 174, 176 may further eliminate the use of separate brackets used to secure the additional components to the vehicle 10, resulting in further weight savings and cost savings.

Assembly of Side Sill Having Side Sill Reinforcement Panel 32 of FIGS. 11-17

Figure 11:
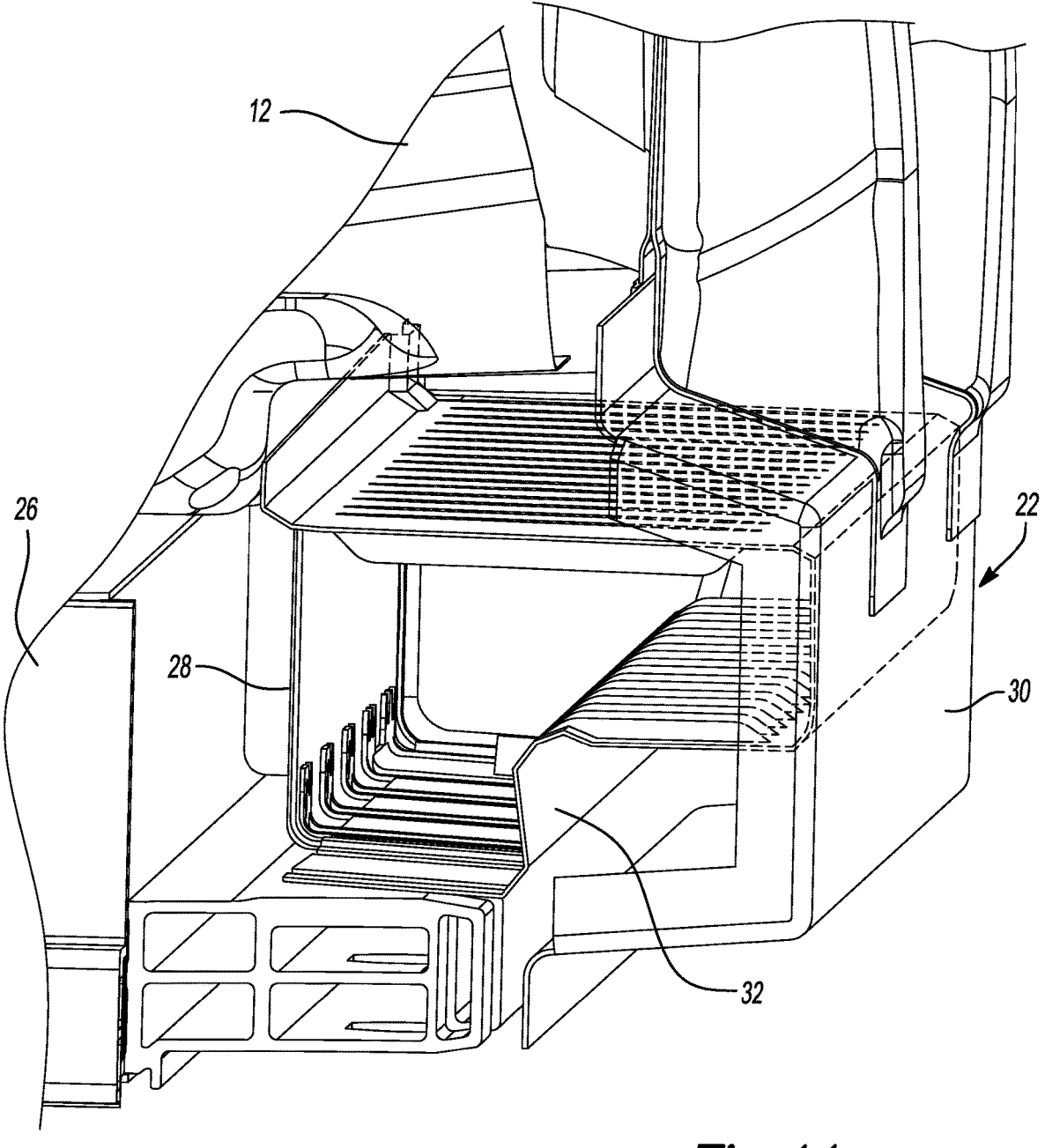
FIG. 11 is a partial detail cutaway perspective view of a side sill having a second embodiment of a side sill reinforcement panel in accordance with the present disclosure.
Figure 17:
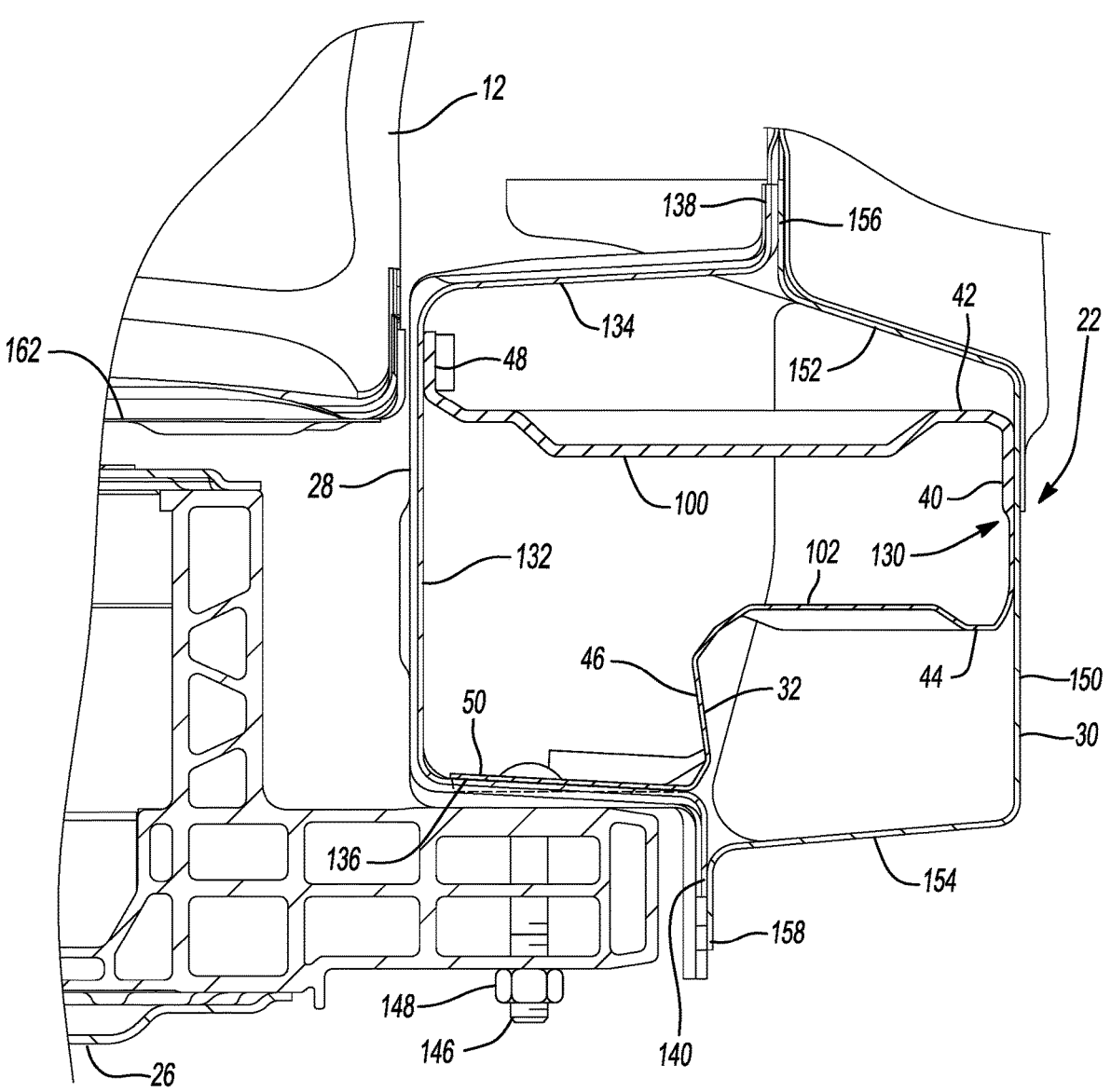
FIG. 17 is a section view of the side sill of FIG. 11.

With reference to FIGS. 11, 12, and 17, the side sill inner panel 28, side sill outer panel 30, and the side sill reinforcement panel 32 cooperate to form the side sill 22. The side sill reinforcement panel 32 is coupled to the side sill inner panel 28 and side sill outer panel 30. As shown in FIG. 17, the first flange 48 of the side sill reinforcement panel 32 is coupled to the first inner wall 132 of the side sill inner panel 28 and the first wall portion 40 of the side sill reinforcement panel 32 is coupled to the first outer wall 150 of the side sill outer panel 30.

Additionally, the second flange 50 cooperates with the third inner wall 136 of the side sill inner panel 28. For example, the second flange 50 has an angle that corresponds to the angle of the third inner wall 136 with respect to the first wall portion 40 of the side sill reinforcement panel 32. The second flange 50 is able to mate with the third inner wall 136. The second flange 50 of the side sill reinforcement panel 32 is coupled to the third inner wall 136 of the side sill inner panel 28.

With continued reference to FIG. 17, the first inner flange 138 of the side sill inner panel 28 is coupled to the first outer flange 156 of the side sill outer panel 30. In some embodiments, one or more additional panels may be sandwiched between and/or coupled to the first inner flange 138 of the side sill inner panel 28 is coupled to the first outer flange 156 of the side sill outer panel 30. The side sill 22 has a closed polygonal shape in cross-section with the first flange 48 and the second flange 50 being positioned within the closed polygonal shape and coupled to the side sill inner panel 28. Preferably, the second wall portion 42 of the side sill reinforcement panel 32 is aligned with the floor pan 162 of the vehicle body 12.

The side sill reinforcement panel 32 is coupled to the side sill inner panel 28 and side sill outer panel 30 by one or more coupling devices, including but not limited to bolts, welds, structural adhesives, and rivets. For example, in some embodiments, the first flange 48 of the side sill reinforcement panel 32 is coupled to the first inner wall 132 of the side sill inner panel 28 by one or more spot welds and structural adhesive placed between the first flange 48 and the first inner wall 132. The first wall portion 40 of the side sill reinforcement panel 32 is coupled to the first outer wall 150 of the side sill outer panel 30 by one or more spot welds and structural adhesive placed between the first wall portion 40 and the first outer wall 150. The second flange 50 of the side sill reinforcement panel 32 is coupled to the third inner wall 136 of the side sill inner panel 28 by one or more spot welds and structural adhesive placed between the second flange 50 and the third inner wall 136. The spot welds are configured to hold the side sill reinforcement panel 32, the side sill inner panel 28, and the side sill outer panel 30 together while the structural adhesive cures.

Operation of the Side Sill During a Side Pole Crash

Now, operation of the side sill 22, and particularly the side sill reinforcement panel 32, during a side pole crash is described. When a pole contacts the side sill 22, the pole will first contact the impact region 52, namely the first outer wall 150 of the side sill outer panel 30, and then will contact the first wall portion 40 of the side sill reinforcement panel 32. The force of the impact is then absorbed by the second wall portion 42 in the first crush region 54 and the third wall portion 44 in the second crush region 56 of the side sill reinforcement panel 32, with the second wall portion 42 configured to absorb more of the impact than the third wall portion 44. The ribs 100 and 102 add strength to the second wall portion 42 and the third wall portion 44 and are configured to increase the ability of the side sill reinforcement panel 32 to absorb energy from the impact of the pole. Additionally, because in some embodiments, the second wall portion 42 is aligned with the floor pan 162 of the vehicle body 12, force from the impact can be transferred into the floor pan 162 instead of into the passenger compartment, and the battery pack 26 (if included in the vehicle 10). The side sill reinforcement panel 32 provides more dynamic crush without a significant increase in the pole force. The side sill reinforcement panel 32 reduces or eliminates intrusion into the passenger compartment. In a vehicle 10 with a battery pack 26, the side sill 22 is configured to remain outside the enclosure of battery pack 26 following a side pole crash. With the side sill 22 remaining outside of the battery pack 26, intrusions into the battery pack 26 are eliminated, which in turn reduces or eliminates the possibility of high voltage shocks and/or fires following a side pole crash. The side sill 22 is configured to meet or exceed Global NCAP, Euro NCAP, and US NCAP side pole crash tests.

Benefits and Advantages

The side sill 22, and particularly the side sill reinforcement panel 32, described herein provides significant advantages. For example, the side sill reinforcement panel 32 is configured to extend the length of the side sill 22 between the front and rear wheels 14, 16 of the vehicle 10. In battery electric vehicle applications, the side sill reinforcement panel 32 is designed to be at least equal to the length of the battery pack 26 so that the side sill reinforcement panel 32 covers any possible concentrated impact throughout the battery pack 26. Additionally, the stamped steel side sill reinforcement panel 32 can be implemented without modifying the existing underbody and/or floor pan 162 of the vehicle 10. The tailor rolled sheet construction of the unitary side sill reinforcement panel 32 provides better joint performance and saves on processing costs when compared to a two- or multi-piece construction.

The unitary steel side sill reinforcement panel 32 provides additional benefits over existing extruded aluminum side sill reinforcements. For example, the estimated material and process cost savings with the side sill reinforcement panel 32 is four (4) to five (5) times less than existing aluminum multi-core extrusions, which results in a potential cost savings. Additionally, the unitary steel side sill reinforcement panel 32 has higher strength and elongation, with a reduced possibility of tearing compared to existing aluminum extrusion side sill reinforcements. The unitary steel side sill reinforcement panel 32 is better integrated with the steel side sill inner panel 28 and the steel side sill outer panel 30 and provides better distribution of the crash load than a separate aluminum extrusion side sill reinforcement. Furthermore, the steel sheet material and the stamping equipment used to form the steel side sill reinforcement panel 32 may be available locally in the same plant used for stamping the side sill inner panel 28, the side sill outer panel 30, and/or the vehicle body 12, and therefore does not require the shipment of extruded aluminum side sill reinforcements from a separate factory. Moreover, the use of steel in the side sill reinforcement panel 32, the side sill inner panel 28, and the side sill outer panel 30 eliminates the possibility of electrogalvanic corrosion that is possible with steel side sill inner and outer panels and an extruded aluminum side sill reinforcement. Additionally, embodiments of the side sill reinforcement panel 32 eliminate the use of additional brackets needed to assemble the extruded aluminum side sill reinforcement and the battery pack 26, which results in reduced cost and reduced vehicle weight. For example, in some embodiments, the side sill reinforcement panel 32 shown in FIGS. 2-10 provides a 0.8 kg weight savings per vehicle 10 as compared to a vehicle having extruded aluminum side sill reinforcements. As an additional example, in some embodiments, the side sill reinforcement panel 32 shown in FIGS. 11-17 provides a 2.0 kg weight savings per vehicle 10 as compared to a vehicle having extruded aluminum side sill reinforcements.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A vehicle body, the vehicle body comprising:
a side sill, the side sill comprising:
    a side sill inner panel;
    a side sill outer panel; and
    a unitary side sill reinforcement panel located between the side sill inner panel and the side sill outer panel, the side sill reinforcement panel comprising:
        a first wall portion, wherein the first wall portion is coupled to the side sill outer panel;
        a second wall portion, wherein the second wall portion extends from the first wall portion away from the side sill outer panel toward the side sill inner panel;
        a third wall portion, wherein the third wall portion extends from the first wall portion away from the side sill outer panel toward the side sill inner panel;
        a fourth wall portion, wherein the fourth wall portion extends from the third wall portion;
        a first flange, wherein the first flange extends from the second wall portion and the first flange is coupled to the side sill inner panel; and
        a second flange, wherein the second flange extends from the fourth wall portion and the second flange is coupled to the side sill inner panel.
2. The vehicle body of claim 1, wherein the first flange and the second wall portion have a first thickness and the third wall portion, the fourth wall portion, and the second flange have a second thickness, wherein the second thickness is less than the first thickness.
3. The vehicle body of claim 2, wherein a first portion of the first wall portion has the first thickness and a second portion of the first wall portion has the second thickness.
4. The vehicle body of claim 1, wherein one or more of the second wall portion and the third wall portion has one or more strengthening elements.
5. The vehicle body of claim 4, wherein the one or more strengthening elements are integrally formed with the side sill reinforcement panel.
6. The vehicle body of claim 1, wherein the second wall portion extends from the first wall portion at an angle ranging from about 85 degrees to about 95 degrees with respect to the first wall portion.
7. The vehicle body of claim 1, wherein the third wall portion extends from the first wall portion at an angle ranging from about 85 degrees to about 95 degrees with respect to the first wall portion.

8. The vehicle body of claim 1, wherein the second flange is parallel to the first wall portion.

9. The vehicle body of claim 1, wherein the second flange is perpendicular to the first wall portion.

10. The vehicle body of claim 1, wherein the side sill inner panel comprises:

a first inner wall;

a second inner wall extending from the first inner wall;

a third inner wall extending from the first inner wall;

a first inner flange extending from the second inner wall; and a second inner flange extending from the third inner wall.

11. The vehicle body of claim 10, wherein the first flange of the side sill reinforcement panel is coupled to the first inner wall of the side sill inner panel.

12. The vehicle body of claim 10, wherein the second flange of the side sill reinforcement panel is coupled to the second inner flange of the side sill inner panel.

13. The vehicle body of claim 10, wherein the second flange of the side sill reinforcement panel is coupled to the third inner wall of the side sill inner panel.

14. The vehicle body of claim 10, wherein the side sill outer panel comprises:

a first outer wall;

a second outer wall extending from the first outer wall;

a third outer wall extending from the first outer wall;

a first outer flange extending from the second outer wall; and a second outer flange extending from the third outer wall.

15. The vehicle body of claim 14, wherein the first wall portion of the side sill reinforcement panel is coupled to the first outer wall of the side sill outer panel.

16. The vehicle body of claim 14, wherein the second flange of the side sill reinforcement panel is sandwiched between the second outer flange of the side sill outer panel and the second inner flange of the side sill inner panel.

17. A vehicle body, the vehicle body comprising:

an impact resistant side sill, the side sill comprising:

a side sill inner panel including a first flange and a second flange;

a side sill outer panel including a third flange and a fourth flange; and a side sill reinforcement panel located between the side sill inner panel and the side sill outer panel, the side sill reinforcement panel including a fifth flange and a sixth flange;

the side sill having a closed polygonal shape in cross-section, wherein the first flange is coupled to the third flange, the fifth flange and the sixth flange being positioned within the closed polygon shape and coupled to the side sill inner panel, wherein the sixth flange includes a hole through which a fastener may extend, the fastener configured to mount a battery pack to the vehicle.

18. The vehicle body of claim 17, wherein the vehicle comprises a battery pack and the side sill remains positioned outside of the battery pack following a side pole impact crash test.

* * * * *